(12) United States Patent
Hillier et al.

(10) Patent No.: US 7,744,344 B2
(45) Date of Patent: Jun. 29, 2010

(54) VANE COUPLING

(75) Inventors: Steven M Hillier, Manchester (GB); William Richards, Derby (GB)

(73) Assignee: Rolls-Royce plc, London (GB)

( * ) Notice: Subject to any disclaimer, the term of this patent is extended or adjusted under 35 U.S.C. 154(b) by 853 days.

(21) Appl. No.: 11/395,150

(22) Filed: Apr. 3, 2006

(65) Prior Publication Data
US 2006/0245926 A1 Nov. 2, 2006

(30) Foreign Application Priority Data
Apr. 30, 2005 (GB) .............................. 0508912.3

(51) Int. Cl.
*F01D 9/06* (2006.01)
*F01D 25/26* (2006.01)
(52) U.S. Cl. .................. 415/209.3; 415/115; 415/116; 415/136; 403/336; 403/337; 403/338; 285/328; 285/376; 285/401; 285/913
(58) Field of Classification Search .............. 415/208.1, 415/209.3, 209.2, 191, 139, 211.2, 115, 116, 415/134, 136, 138; 416/204 R, 232, 96 R, 416/96 A, 97 R; 403/335, 336, 337–338; 285/328, 376, 401, 913
See application file for complete search history.

(56) References Cited

U.S. PATENT DOCUMENTS

| 2,195,492 | A | * | 4/1940 | McDonald | 285/330 |
| 3,544,138 | A | * | 12/1970 | von Eiff | 285/336 |
| 3,623,753 | A | * | 11/1971 | Henry | 285/330 |
| 3,741,680 | A | * | 6/1973 | Killmann et al. | 415/214.1 |
| 3,829,816 | A | * | 8/1974 | Barry et al. | 439/191 |
| 4,245,951 | A | | 1/1981 | Minnich | |
| 5,127,293 | A | * | 7/1992 | Chatham | 83/136 |
| 6,439,616 | B1 | | 8/2002 | Karafillis | |

FOREIGN PATENT DOCUMENTS

JP     2004092398 AB     3/2004

* cited by examiner

Primary Examiner—Christopher Verdier
(74) Attorney, Agent, or Firm—Jeffrey S. Melcher; Manelli Denison & Selter PLLC

(57) ABSTRACT

Vanes are generally hollow with a passage through which service pipes extend. These service pipes must be connected such that they can allow for thermal expansion and contraction but also anti rotation features are needed in order to prevent damage when a supply coupling is connected through a pipe end. This anti-rotation feature is generally provided between a top hat and a pipe end through flanges. In order to allow reduced spacing between the top of the vane and a casing the flanges are arranged to allow at least recessing of a first flange into a passage opening profile whereby those flanges inter-engage with second flanges at a surface interface to prevent rotation.

19 Claims, 4 Drawing Sheets

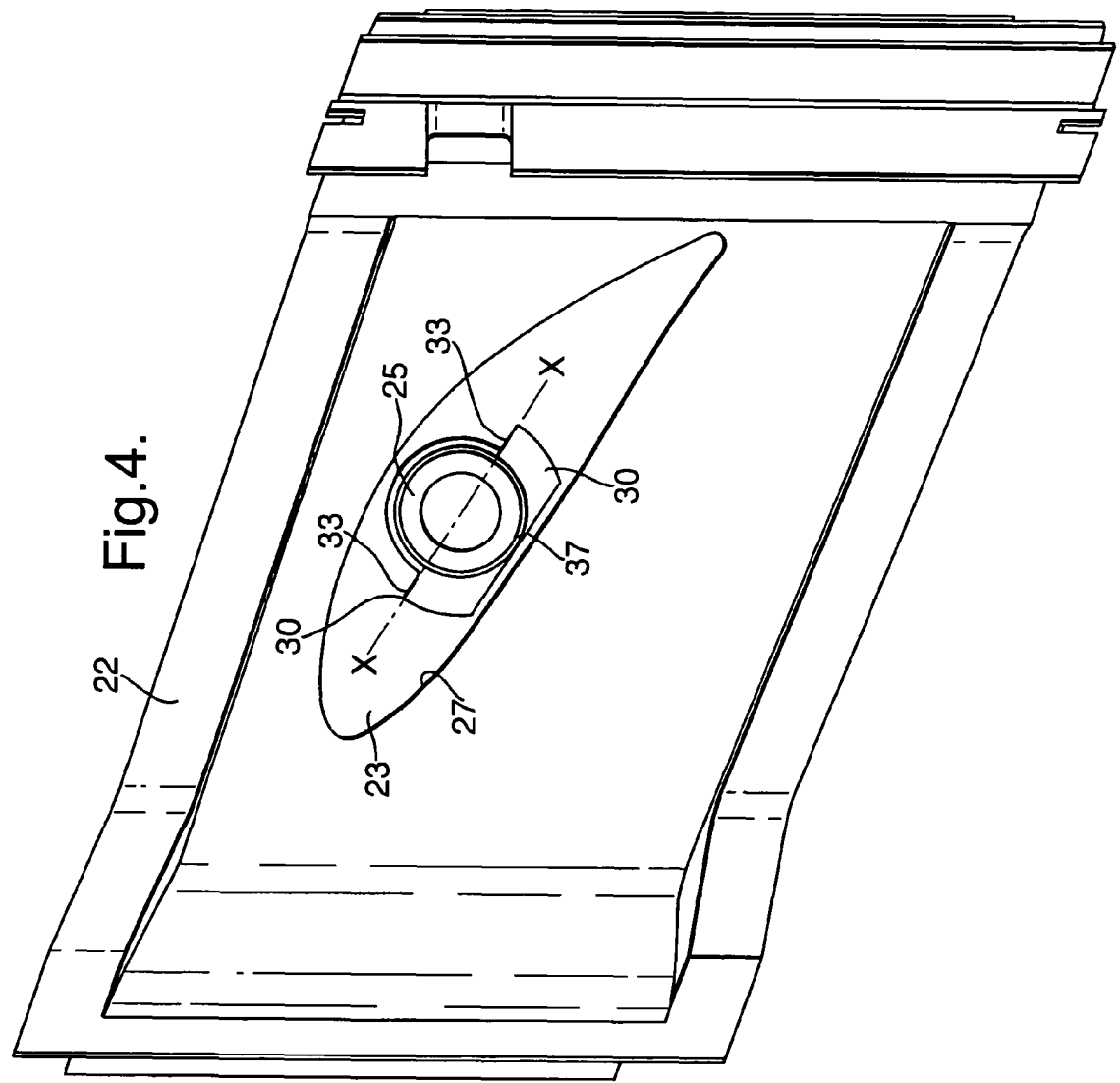

VANE COUPLING

FIELD OF THE INVENTION

The present invention relates to vane coupling and more particularly to a vane coupling in an intermediate pressure nozzle guide vane for coupling the coolant airflow passage network within that vane to a coolant supply.

BACKGROUND OF THE INVENTION

Operation of gas turbine engines is well known along with use of nozzle guide vanes in order to guide gas flow within the engine for improved performance. The nozzle guide vanes are essentially located in the flow path between the casing and core of the engine. Dependent upon position these guide vanes are clearly subjected to high temperatures and so require cooling. In order to provide that cooling it will be understood that cooling passages will be provided particularly at the surfaces of the guide vane through which coolant air passes in order to cool the vane in operation.

The aerofoil thickness of a nozzle guide vane relates directly to turbine efficiency within a gas turbine engine. The speed of flow over the suction surface can attain supersonic speeds. Reducing aerofoil thickness can reduce flow blockage which in turn reduces flow speed and increases engine performance. In such circumstances, reduced aerofoil thickness can have advantages but it will also be understood that generally service pipes in order to provide coolant air and for lubricants supplied to and from an engine core hub will also be required. Accommodation of such service pipes is generally more difficult with a reduced aerofoil thickness.

Existing designs for coupling service pipes provide a pipe which passes through the guide vane from a hub. An end fitting is secured to the pipe with a top hat element then secured over the end fitting for coupling to external supply passages, and as indicated previously possibly for coolant air or oil. It will be appreciated that the top hat and end fitting essentially provide three functions. The primary function is to provide a robust mechanical connection for an external union joint e.g. nut and bolt assembly to be fastened onto in order to create the coupling between them. A second function is to provide a spherical seal to prevent leakage and so release of high pressure air or lubricant within the casing escaping to atmosphere outside of the casing. A final function is to provide an anti rotation feature which prevents pipe damage on tightening the threaded conical union joint as described above as the primary function. It will also be understood that the coupling can articulate around the centre of the spherical seal and also slide in a radial direction along the axis of the pipe to accommodate for thermal growth during engine operational thermal cycling.

These prior arrangements provide an anti-rotation function by virtue of a symmetrical arrangement. In short the top hat connector will fully encircle the anti-rotation lug features providing reaction points on two of the faces when tightening and the other two faces when untightening. Such an approach is acceptable where there is ample clearance between the vane end incorporating the coupling and the casing as the coupling can be situated externally of the vane platform. However, increasingly engine geometry provides much reduced space between the vane and the casing. In such circumstances an outboard top hat will result in a clash between the top hat part of the coupling and the vane. Previous solutions to this problem have been to increase the spacing by moving the casing further outboard and so increasing the clearance but with the detrimental effect of increasing overall engine weight due to a larger than otherwise needed casing. The other alternative is to provide a wider guide vane to accept the symmetrical top hat, but as indicated previously such widening of the guide vane will have a major detrimental effect upon turbine efficiency in terms of gas flow and therefore engine performance.

It is important that there is no clash between the top hat member and the vane as this may create distortion and straining of the pipe with potential failure of the seal, etc whilst as indicated accommodation of the top hat member will require either increasing the casing size adding to weight or increasing the width of the vane reducing aerodynamic efficiency.

SUMMARY OF THE INVENTION

In accordance with the present invention there is provided a vane mounting arrangement for a gas turbine engine, the arrangement comprising a pipe end and a top hat member, the pipe end having a first lateral flange and the top hat member having a second lateral flange, the first lateral flange and the second lateral flange engaging upon each other in use to prevent rotation between the pipe end and the top hat, the arrangement characterised in that the first lateral flange and the second lateral flange are offset relative to each other.

Alternatively, in accordance with the present invention there is provided a vane mounting arrangement for a gas turbine engine, the arrangement comprising a hollow vane to accommodate a pipe in a passage or cavity with a pipe end for engaging a top hat member, the pipe end having a first lateral flange and the top hat member having a second lateral flange which engage upon each other in use to prevent rotation, the arrangement characterized in that the first lateral flange and the second lateral flange are offset relative to each other to allow recession of at least part of the first lateral flange into a passage profile of the passage or cavity.

Possibly, the second lateral flange may also extend within the passage profile.

Generally, the top hat member is anchored to a casing.

Normally, the first lateral flange and the second flange member are asymmetrical about a lateral direction of the first and the second lateral flanges in their respective pipe end and top hat member.

Typically, the first and the second lateral flange are truncated collar segments extending away from a longitudinal axis for the pipe end and the top hat member. Normally, the pipe end and the top hat member incorporate two pairs of first and second lateral flanges arranged in diametrically opposite parts of the respective pipe end and top hat member.

Possibly, the first and the second lateral flanges have keyed associative engagement therebetween. Possibly that keyed associative engagement is through reciprocal castellations. Alternatively, the keyed associative engagement is through segment engagement between the first lateral flange and the second lateral flange.

Generally, an outer surface of the first and/or second lateral flange is shaped for consistency with the passage profile in use.

Generally, the pipe end and the top hat member include associated sealing means to form a seal coupling for the pipe end to a supply pipe. Generally, the sealing means provides for axial as well as for articulated deflection of the pipe end relative to the top hat member.

Possibly, the pipe end and the top hat include means to secure them together. Generally the means to secure together the top hat member and the pipe end comprises a screw thread on the pipe end extending through the top hat member and a nut for securing on the screw thread to clamp the top hat member therebetween.

BRIEF DESCRIPTION OF THE DRAWINGS

Embodiments of the present invention will now be described by way of example only and with reference to the accompanying drawings in which:—

DETAILED DESCRIPTION OF THE INVENTION

As indicated above, nozzle guide vanes (NGV) are used in gas turbine engines in order to improve gas flow performance and therefore engine performance. These vanes are mounted between an engine core and a casing at appropriate radial spacings in accordance with desired performance. In such circumstances, at least some of the nozzle guide vanes have surface pipes for coolant or lubricants passing through them to the casing periphery of the engine. These surface pipes must be connected to their supply pipe and this is achieved as described above through use of a pipe end welded on the end of the service pipe passing through the vane, and a top hat member which is anchored to the casing and which allows the supply pipe to be secured to the pipe end through an appropriate screw thread and nut connector. In such circumstances the arrangement provides means for securing the supply pipe to the service pipe passing through the vane as well as normally appropriate sealing between the service pipe and the end pipe to avoid leakage. It will be appreciated that in utilizing such securing techniques as a nut connector attached to a screw thread of the end pipe, potentially high torque forces will be applied to the pipe end. These forces may be exacerbated if there is any carbonization of fluids such as lubricants which can stiffen the coupling if it is necessary to release it for servicing, etc.

In the above circumstances, as described previously, essentially relatively robust flange elements are provided which generally provide in the top hat a symmetrical radial flange with cut out sections which define a slot on either side of the radial flange in which laterally extending lugs in the pipe end engage in order to provide for anti-rotation when the supply pipe is secured on the screwthread of the pipe end. It will be understood that the service pipe will expand and contract with thermal cycling and therefore this flange member interaction should be able to accommodate for axial movement of the pipe as well as providing the end pipe to top hat member combination with a degree of articulation. It will be appreciated that failure of a service pipe in a guide vane would have significant cost implications with respect to stripping an engine down in order to replace that pipe, and therefore a fail safe approach is taken to ensure that the anti-rotation features provided by the inter engaging flange members in prior systems have in built margin for error with respect to potential failure.

Use of symmetrical top hat radial flange members in order to form a slot is acceptable where there is ample space between the nozzle guide vane and the casing.

Figure 1:
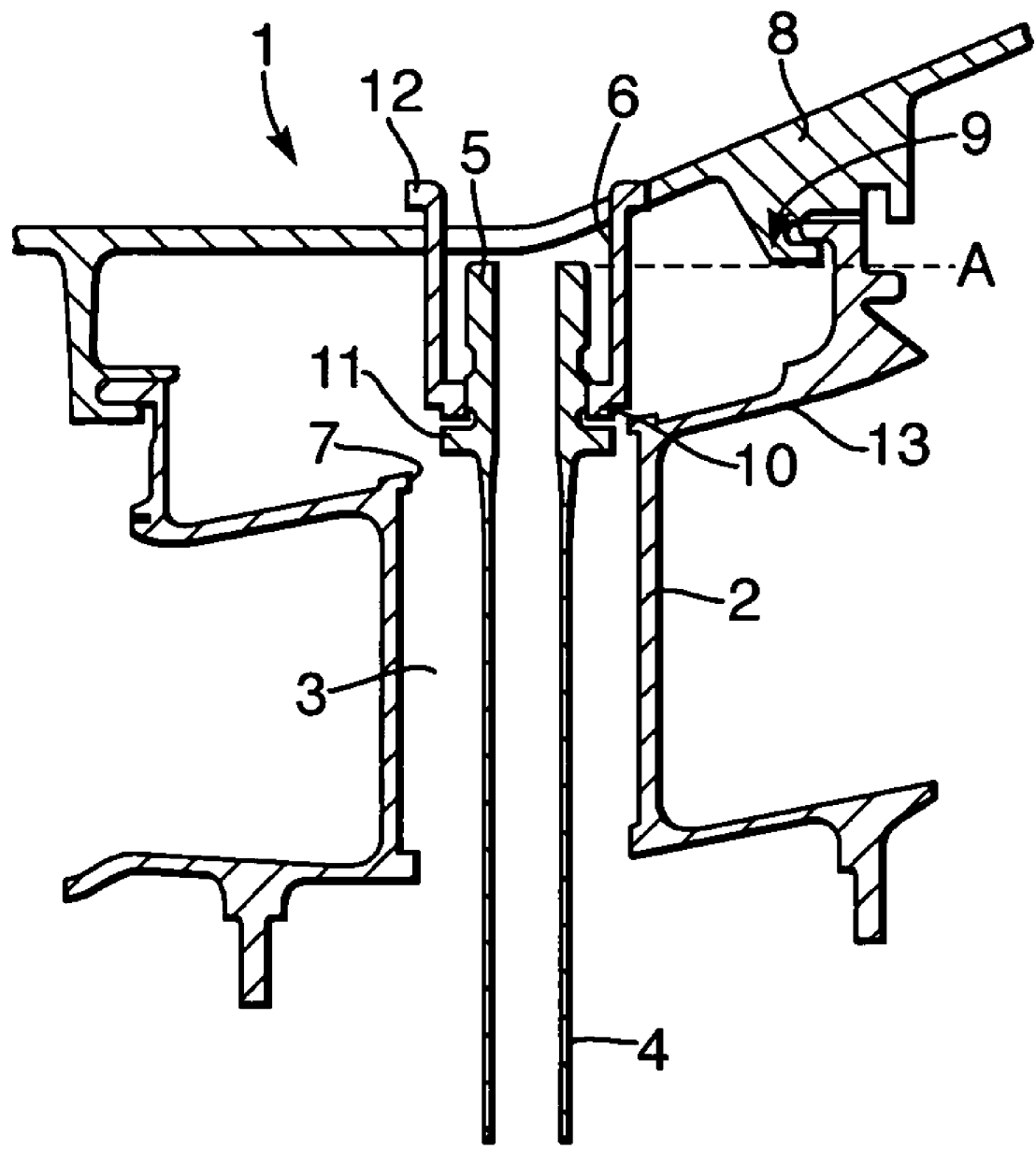
FIG. 1 is a pictorial representation of a nozzle guide vane with associated service pipe, pipe end and top hat member in accordance with the present invention.

FIG. 1 provides a pictorial representation of a vane mounting arrangement in accordance with the present invention as a schematic cross section. Thus, the arrangement 1 has a nozzle guide vane (NGV) 2 in which a passage or cavity 3 accommodates with a pipe 4. This pipe 4 as indicated previously will be a service pipe for coolant or lubricant within a gas turbine engine. A pipe end 5 is secured to the pipe 4 and this in turn is associated with a top hat member 6. In the representations shown in FIG. 1 it will be noted that the pipe end 5 is substantially proud of the top opening 7 of the passage 3. This is to allow the top hat 6 to sit over the end pipe 5 to provide an arrangement in which the pipe 4, pipe end 5 and top hat 6 are essentially anchored to a casing 8 through anchor means not shown.

In FIG. 1 it will be seen that although the top of the pipe end 5 is positioned such that it will clear a rear hook 9 of the casing 8 (see dotted line A) there is limited clearance space between the top of the pipe end 5 and the casing 8 so that the top hat 6 will clash with the casing 8.

A solution would be to recess the end pipe 5 into the opening 7 but as indicated previously this would require increasing the nozzle guide vane with a symmetrical flange leading to a compromise with respect to turbine efficiency within the engine. The pipe end 5 extends proud of the opening 7 in order to ensure there is good engagement between the anti-rotation flanges which as indicated previously will tend to comprise a symmetrical radial flange (not shown) extending down from a bottom edge 10 of the top hat 6 and lateral lugs 11 of the pipe end 5. This anti-rotation engagement between the lugs 11 and radial flange with slot cut outs prevents relative rotation between the end 5 and the top hat 6. Thus, as the top hat 6 will be secured to the casing 8, rotation of the pipe 4 and end 5 will be prevented by this anchoring when a supply pipe coupling is attached to a screw thread end of the pipe end 5. Clearly, the arrangement shown in FIG. 1 would be unacceptable as the top hat 6 has a side 12 raised proud above the casing 8 and therefore cannot provide an appropriate anchor location for the top hat 6.

The present invention allows a pipe end to be recessed within an opening of a passage within a nozzle guide vane such that the top hat can therefore be presented closer to a top platform 13 of the guide vane 2. In order to achieve this the anti-rotation engagement between opposed flanges in the top hat and the pipe end is arranged to occur within the passage or cavity 3, that is to say the anti-rotation engagement occurs within the passage profile rather than above it. It will be understood to achieve this the anti-rotation engagement through the flanges must remain within the passage 3 profile with an appropriate clearance. As indicated, the width of the guide vane 2 is determined by aerodynamic effects in order to achieve turbine efficiency and therefore this passage 3 profile will be relatively narrow which is one of the reasons that in the prior arrangements shown in FIG. 1 the flange engagement for anti-rotation occurs outside of the opening 7.

Figure 2:
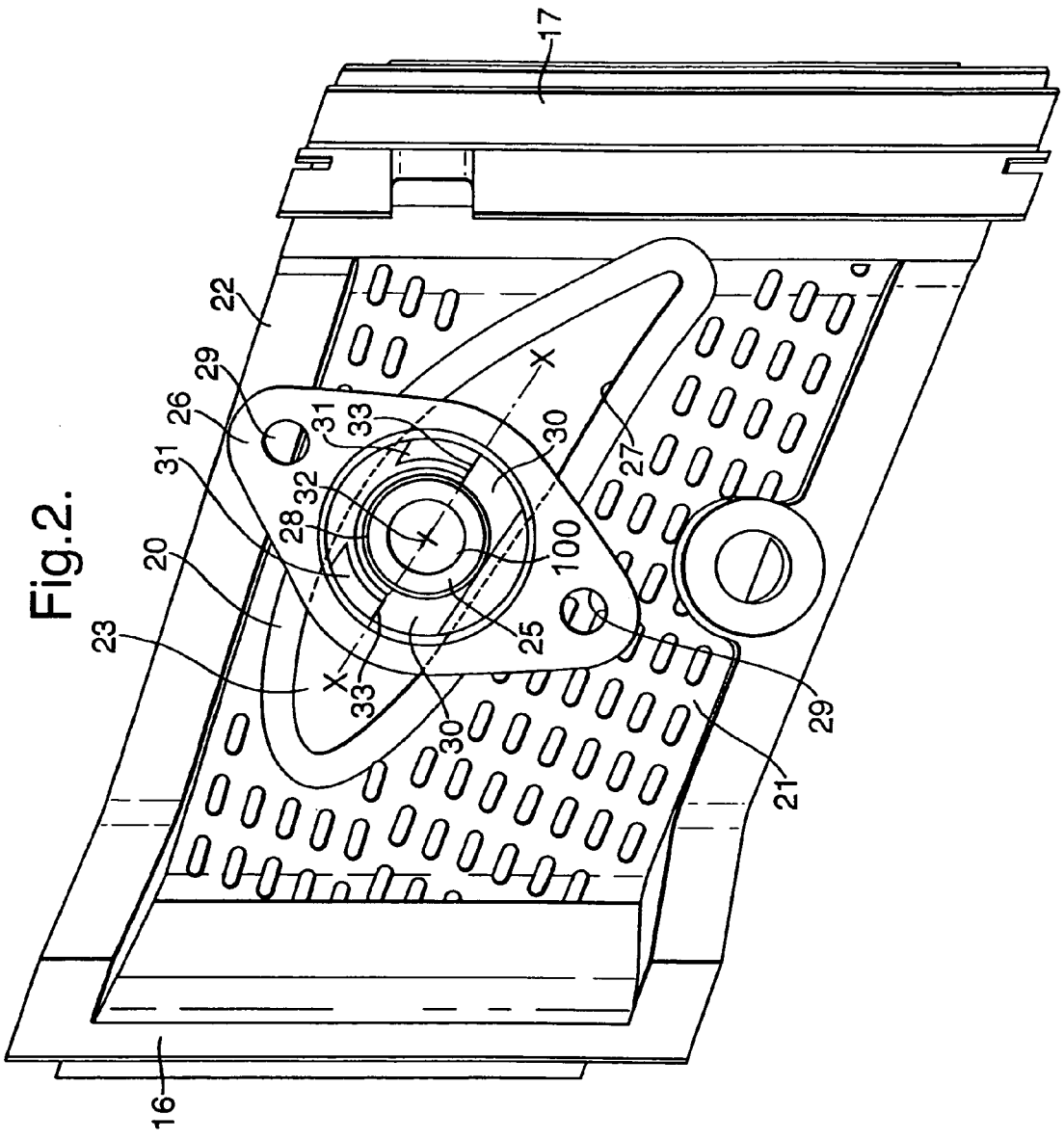
FIG. 2 is a pictorial plan view of a nozzle guide vane with top hat in accordance with the present invention.

FIG. 2 illustrates a plan view of a nozzle guide vane segment including an aerofoil 20 which defines the vane below a platform 21 of the segment 22. As indicated previously, during installation, end parts 16, 17 of the segment 22 will engage hook elements of a gas turbine engine casing in order to achieve location. The aerofoil 20 is essentially hollow with a passage 23 within which a pipe (not shown) passes to an engine core. This pipe as indicated previously will be a service pipe for coolant or lubricant or a conduit for electrical wiring. In any event, a top hat member 26 is provided upon which an end pipe 25 is secured. As indicated above, this end pipe 25 will have a screw thread 28 upon which a supply pipe coupling will be secured wherein the screw thread 28 on the pine end 25 extends through the top hat member and a nut 100 is provided for securing on the screw thread to clamp the top hat member 26 therebetween in use.

The top hat member 26 includes apertures 29 by which the top hat will be firmly anchored to a casing (not shown) of a gas turbine engine.

It will be noted that the passage 23 defines an opening 27 within which the anti-rotation interaction between flange members of the top hat 26 in accordance with the present invention and the pipe end 25 must occur in order to allow recessing into the passage 23. In accordance with the present invention this interaction is achieved by providing offset lateral flanges in both the top hat 26 and the pipe end 25. A first pair of lateral flanges 30 extend outwardly from a longitudinal axis 32 of the pipe end 25 and are offset and asymmetrical across a lateral line X-X of the pipe end 25. These first lateral flanges 30 are engaged by second lateral flanges 31 which extend downward towards the passage 23. It would be appreciated that these second lateral flanges 31 are reciprocally offset and asymmetrical in the top hat member 26 about the same lateral direction X-X on the other side. In such circumstances opposed surfaces of the first flanges 30 and the second flanges 31 inter-engage with each other in order to prevent rotation. In such circumstances as the top hat member 26 is anchored through the apertures 29 and appropriate fixing means to the casing, rotation of the pipe end 25 and therefore pipe is prevented.

The flanges 30, 31 are therefore within the passage 23 profile and so these flanges 30, 31 can recess into that profile 23 defined by the opening 27 periphery. It will be understood in a practical embodiment appropriate clearances will be insured between these flanges 30, 31 and that opening 27 periphery to accommodate for thermal expansion, vibration and tolerance stack up to avoid clashing between the pipe end 25, top hat 26 and the service pipe (not shown) in operational use.

The flanges 30, 31 essentially comprise truncated collar segments in order to fit within the passage 27 profile and will have a thickness such that the inter engagement surface 33 between the flanges 30, 31 is wide enough and robust enough in view of the nature of the materials from which the flanges 30, 31 are made to prevent rotation despite significant torque loads applied for rotation and fixing of the coupling.

Figure 3:
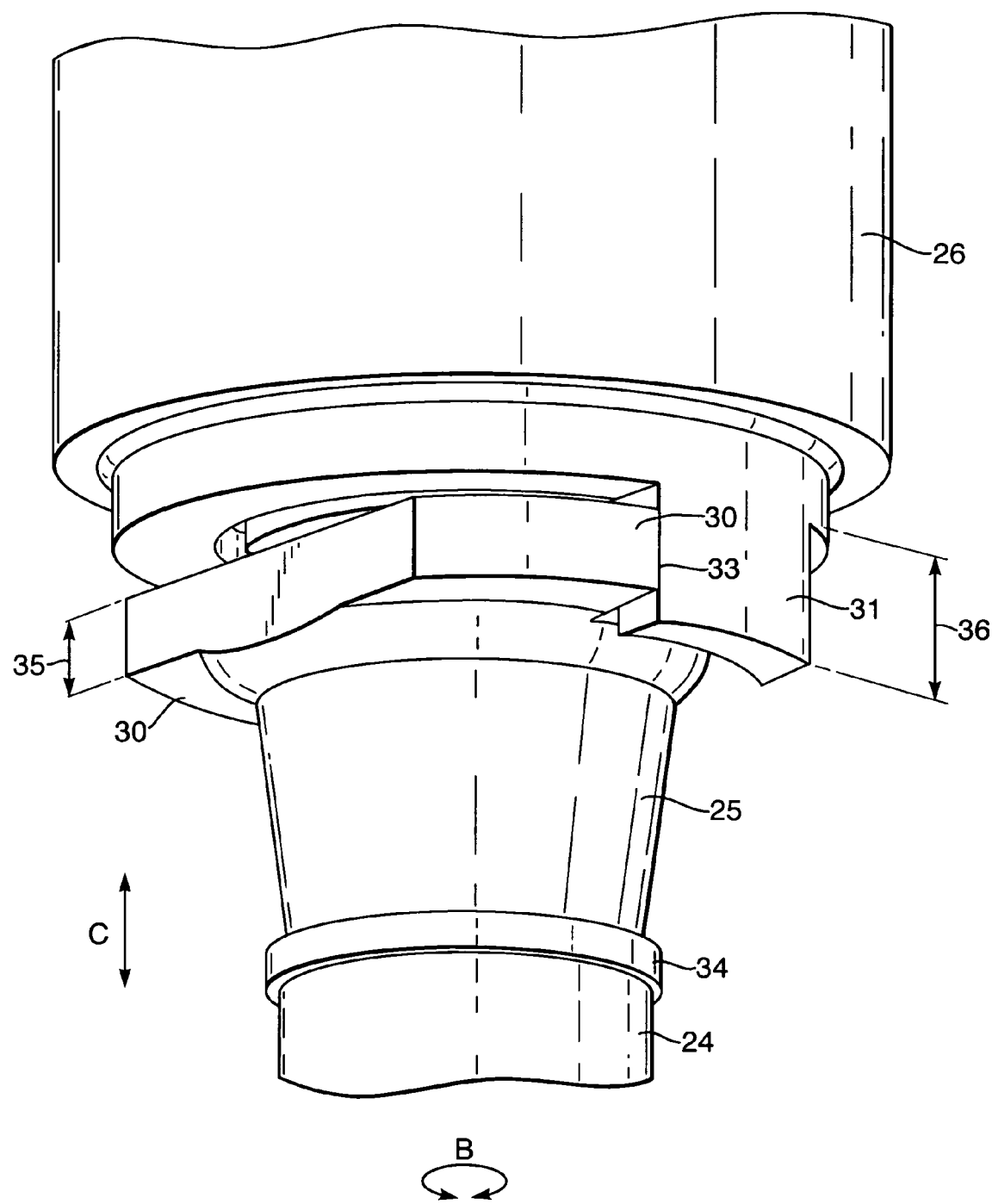
FIG. 3 is a front schematic perspective view of a pipe end and top hat member in accordance with the present invention; and, FIG. 4 is a pictorial cross section illustrating engagement between lateral flange members in accordance with the present invention.

FIG. 3 is a schematic perspective view providing further details of the mounting arrangement depicted in FIG. 2 and with reference numerals transposed for clarity. Thus, a service pipe 24 is secured to a pipe end 25 through a weld 34 in order to present that pipe end 25 to a top hat member 26. Anti rotation is achieved by inter engagement between first lateral flanges 30 associated with the pipe end 25 and second lateral flanges 31 associated with the top hat member 26. In such circumstances, rotation in the direction of arrowhead B is prevented by the inter engagement at interface 33.

The flanges 30, 31 respectively have engagement depths 35, 36 such that axial displacement in the direction of arrowhead C can be accommodated whilst retaining inter engagement 33 to prevent rotation. It will be appreciated that axial displacement in the direction of arrowhead C may occur through thermal expansion and contraction in use.

FIG. 4 provides a further schematic plan illustration showing a nozzle guide vane segment 22 in which the passage opening profile 27 is illustrated with a pipe end 25 secured to a pipe (not shown) and first flange members 30 in accordance with the present invention presented asymmetrically and offset about the line X-X. The top hat member 26 has been removed but it would be appreciated that the second flanges 31 will be positioned to engage interface surface 33 in order to prevent rotation.

As will be seen, an outer surface 37 of the first flanges 30 will retain a clearance gap from the passage opening profile periphery 27. For various operational purposes in order to maintain flow within the cavity 23 balanced either side of the pipe end 25 and top hat 26 (not shown) the outer surfaces 37 of the flanges 30 as part of the pipe end 25 and the top hat outer surface of the second flanges will generally be shaped for consistency of the clearance gap to the passage opening profile 27.

Generally the principal advantage of the present invention is to provide an anti-rotation facility which can allow recession of at least part of the first flanges 30 formed upon the pipe end 25 but normally it will also be understood that the second flanges formed upon the bottom of the top hat 26 will also extend into the passage opening profile 27 in order to allow greater accommodation for attachment with the casing as required for operational performance.

As indicated above, the service pipes and therefore couplings provided by the pipe end 25 and top hat 26 in accordance with the present invention will be subject to thermal cycling. In such circumstances there may be expansion and contraction and so as indicated facilities must be provided for axial movement between the flanges 30, 31 in the area of surface 33. It will also be understood that within the association between the pipe end 25 and the top hat 26, a degree of articulation would be allowed for similar distortions in pipe presentation in use. Nevertheless, where such articulation is not required or should be restricted, it will be understood that the lateral flanges in accordance with the present invention presented by the pipe end and the top hat may be arranged to have a degree of keyed association. Thus, the flanges in the respective pipe end and top hat may be reciprocally slotted or castellated such that respective tongues and grooves in the slots and castellations inter-engage with each other to prevent rotation, but all within the confines of the passage opening profile 27 as described above. Furthermore, the surface interaction between the flanges may be arranged to incorporate an entrant V rim or otherwise into a reciprocally shaped groove in the other flange.

We claim:

1. A vane mounting arrangement for a gas turbine engine, the arrangement comprising:
   a pipe end having a first lateral flange; and
   a top hat member having a second lateral flange, wherein the first lateral flange and the second lateral flange engage upon each other in use to prevent rotation between the pipe end and the top hat, the first lateral flange and the second lateral flange being offset relative to each other, said pipe end and said top hat including means to secure them together, wherein said means to secure together the top hat member and the pipe end comprises a screw thread on the pipe end extending through the top hat member and a nut for securing on the screw thread to clamp the top hat member between said nut and said pipe end.

2. An arrangement as claimed in claim 1 wherein the first lateral flange and the second flange member are asymmetrical about a lateral direction of the first and the second lateral flanges in their respective pipe end and top hat member.

3. An arrangement as claimed in claim 1 wherein the first and the second lateral flange are truncated collar segments extending away from a longitudinal axis for the pipe end and the top hat member.

4. An arrangement as claimed in claim 1 wherein the pipe end and the top hat member incorporate two pairs of first and second lateral flanges arranged in diametrically opposite parts of the respective pipe end and top hat member.

5. An arrangement as claimed in claim 1 wherein the first and second lateral flanges have keyed associative engagement therebetween.

6. An arrangement as claimed in claim 5 wherein the keyed associative engagement is through reciprocal castellations.

7. An arrangement as claimed in claim 6 wherein the keyed associative engagement is through segment engagement between the first lateral flange and the second lateral flange.

8. A vane mounting arrangement for a gas turbine engine, the arrangement comprising a hollow vane to accommodate a pipe in a passage or cavity with a pipe end for engaging a top hat member, the pipe end having a first lateral flange and the top hat member having a second lateral flange which engage upon each other in use to prevent rotation, the arrangement characterized in that the first lateral flange and the second lateral flange are offset relative to each other to allow recession of at least part of the first lateral flange into a passage profile of the passage or cavity.

9. An arrangement as claimed in claim 8 wherein the second lateral flange may also extend within the passage profile.

10. An arrangement as claimed in claim 8 wherein the top hat member is anchored to a casing.

11. An arrangement as claimed in claim 8 wherein the first lateral flange and the second flange member are asymmetrical about a lateral direction of the first and the second lateral flanges in their respective pipe end and top hat member.

12. An arrangement as claimed in claim 8 wherein the first and the second lateral flanges are truncated collar segments extending away from a longitudinal axis for the pipe end and the top hat member.

13. An arrangement as claimed in claim 8 wherein the pipe end and the top hat member incorporate two pairs of first and second lateral flanges arranged in diametrically opposite parts of the respective pipe end and top hat member.

14. An arrangement as claimed in claim 8 wherein the first and the second lateral flanges have keyed associative engagement therebetween.

15. An arrangement as claimed in claim 14 wherein that keyed associative engagement is through reciprocal castellations.

16. An arrangement as claimed in claim 15 wherein the keyed associative engagement is through segment engagement between the first lateral flange and the second lateral flange.

17. An arrangement as claimed in claim 8 wherein an outer surface of the first and/or second lateral flange is shaped for consistency with the passage profile in use.

18. An arrangement as claimed in claim 8 wherein the pipe end and the top hat include means to secure them together.

19. An arrangement as claimed in claim 18 wherein the means to secure together the top hat member and the pipe end comprises a screw thread on the pipe end extending through the top hat member and a nut for securing on the screw thread to clamp the top hat member between said nut and said pipe end.

* * * * *